US012641663B2

(12) United States Patent
Li

(10) Patent No.: US 12,641,663 B2
(45) Date of Patent: May 26, 2026

(54) SIGNAL STATE DISPLAY METHOD, TERMINAL AND READABLE STORAGE MEDIUM

(71) Applicant: ZTE CORPORATION, Shenzhen (CN)

(72) Inventor: Qiang Li, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 396 days.

(21) Appl. No.: 18/569,399

(22) PCT Filed: Apr. 26, 2022

(86) PCT No.: PCT/CN2022/089395

§ 371 (c)(1),
(2) Date: Dec. 12, 2023

(87) PCT Pub. No.: WO2022/262435

PCT Pub. Date: Dec. 22, 2022

(65) Prior Publication Data

US 2024/0276577 A1      Aug. 15, 2024

(30) Foreign Application Priority Data

Jun. 18, 2021    (CN) ......................... 202110677352.0

(51) Int. Cl.
*H04W 76/18*        (2018.01)
*H04W 24/08*        (2009.01)
(52) U.S. Cl.
CPC ........... *H04W 76/18* (2018.02); *H04W 24/08* (2013.01)
(58) Field of Classification Search
CPC ............................... H04W 76/18; H04W 24/08

(Continued)

(56) References Cited

U.S. PATENT DOCUMENTS 10,645,744 B2 *   5/2020   Chandramouli ...... H04W 48/12
11,271,699 B1 *   3/2022   Eyuboglu ............ H04J 11/0073
(Continued)

FOREIGN PATENT DOCUMENTS

CN        111246543  A        6/2020
CN        111343699  A        6/2020
(Continued)

OTHER PUBLICATIONS

International Searching Authority. International Search Report and Written Opinion for PCT Application No. PCT/CN2022/089395 and English translation, mailed Jul. 19, 2022, pp. 1-10.

(Continued)

*Primary Examiner* — Anthony Mejia
(74) *Attorney, Agent, or Firm* — Vivacqua Crane, PLLC

(57)        ABSTRACT

Disclosed are a signal state display method, a terminal device, and a readable storage medium. The signal state display method may include: monitoring a signal change value of the UE in a current cell of the first-standard network, in response to the UE being in an idle mode; triggering an access request to cause the UE to establish a connection with the first-standard network, in response to the signal change value being greater than a preset signal threshold; updating a current signal state to a signal state corresponding to the second-standard network, in response to accessing the second-standard network through the anchor frequency of the first-standard network; and continuously displaying the updated signal state until a next signal state update.

20 Claims, 9 Drawing Sheets

(58) Field of Classification Search
    USPC ........................................................ 370/252
    See application file for complete search history.

(56)                  References Cited

U.S. PATENT DOCUMENTS

|              |       |         |              |            |
|--------------|-------|---------|--------------|------------|
| 11,343,694   | B2 *  | 5/2022  | Lee          | H04W 24/10 |
| 2014/0099912 | A1    | 4/2014  | Lee et al.   |            |
| 2015/0350977 | A1    | 12/2015 | Xu et al.    |            |
| 2018/0368016 | A1 *  | 12/2018 | Lee          | H04W 24/10 |
| 2019/0097715 | A1 *  | 3/2019  | Maldonado    | H04B 7/0814 |
| 2019/0379469 | A1 *  | 12/2019 | Lu           | H04W 48/16 |
| 2020/0068638 | A1 *  | 2/2020  | Au           | H04L 41/0668 |
| 2020/0229254 | A1 *  | 7/2020  | Chang        | H04W 72/23 |
| 2022/0061001 | A1 *  | 2/2022  | Abdel Shahid | H04W 24/10 |

FOREIGN PATENT DOCUMENTS

| CN |    112004127 | A      | 11/2020 |            |
|----|--------------|--------|---------|------------|
| CN |    112449392 | A      | 3/2021  |            |
| CN |    112601224 | A      | 4/2021  |            |
| CN |    112714475 | A      | 4/2021  |            |
| WO | WO-2018213688 | A1 *   | 11/2018 | H04W 56/001 |
| WO |    2019136630 | A1     | 7/2019  |            |
| WO |    2021109886 | A1     | 6/2021  |            |

OTHER PUBLICATIONS

European Patent Office. Extended European Search Report for EP
Application No. 22823918.2, mailed Oct. 4, 2024, pp. 1-5.
The State Intellectual Property Office of People's Republic of
China. First Office Action and Search Report for CN Application
No. 202110677352.0 and English translation, mailed Mar. 19, 2026,
pp. 1-18.

* cited by examiner

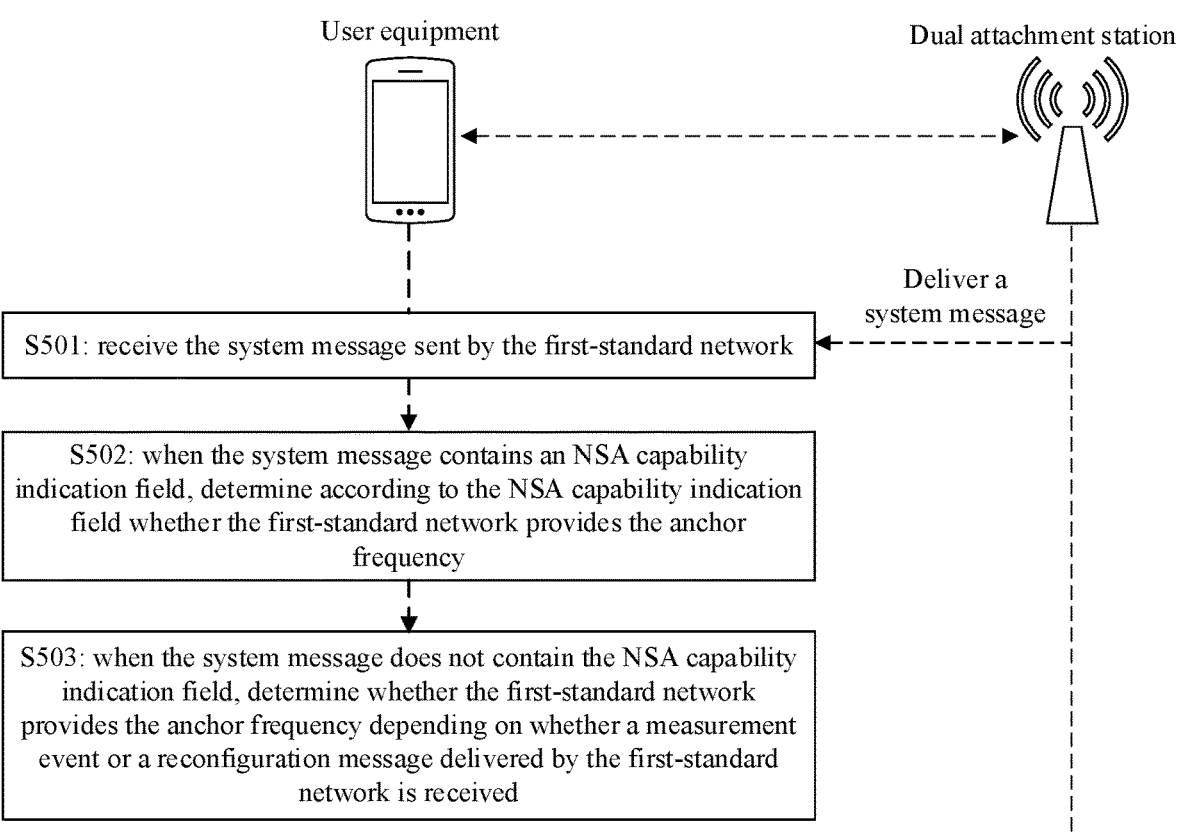

User equipment                                                    Dual attachment station Deliver a
system message S501: receive the system message sent by the first-standard network S502: when the system message contains an NSA capability indication field, determine according to the NSA capability indication field whether the first-standard network provides the anchor frequency S503: when the system message does not contain the NSA capability indication field, determine whether the first-standard network provides the anchor frequency depending on whether a measurement event or a reconfiguration message delivered by the first-standard network is received

Fig. 2

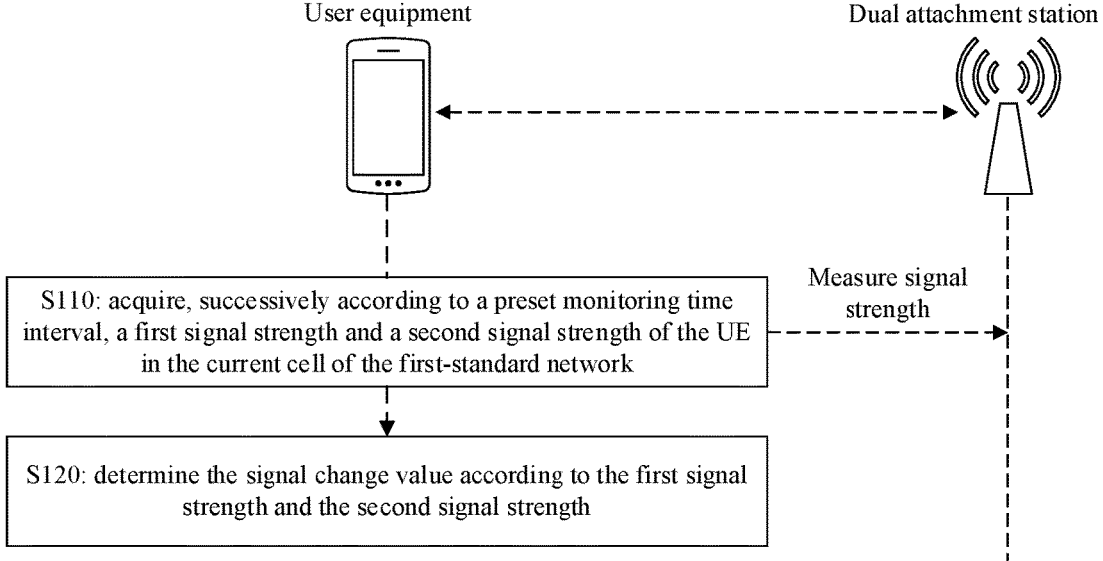

User equipment                                                    Dual attachment station Measure signal
strength S110: acquire, successively according to a preset monitoring time interval, a first signal strength and a second signal strength of the UE in the current cell of the first-standard network S120: determine the signal change value according to the first signal strength and the second signal strength

Fig. 3

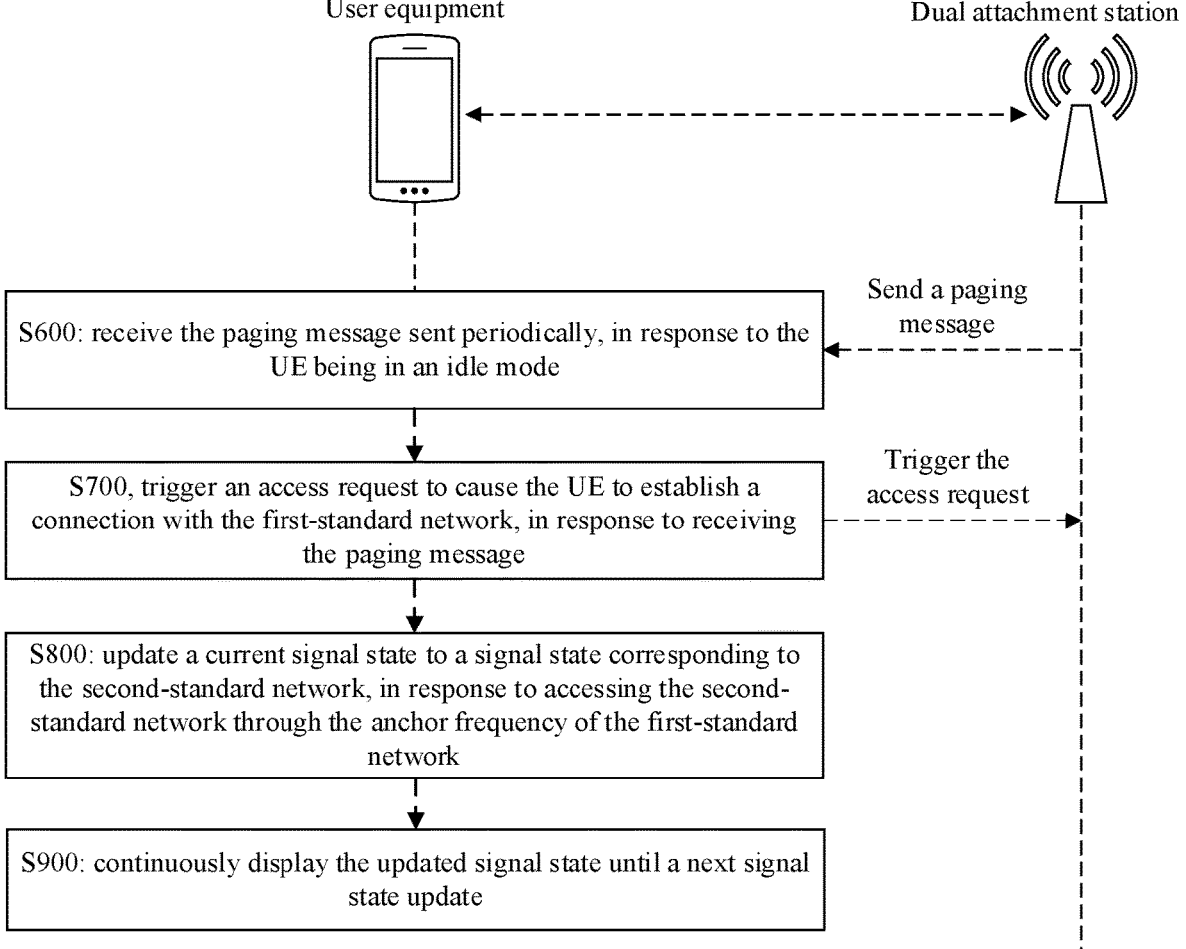

User equipment

Dual attachment station

S600: receive the paging message sent periodically, in response to the UE being in an idle mode Send a paging message S700, trigger an access request to cause the UE to establish a connection with the first-standard network, in response to receiving the paging message Trigger the access request S800: update a current signal state to a signal state corresponding to the second-standard network, in response to accessing the second-standard network through the anchor frequency of the first-standard network S900: continuously display the updated signal state until a next signal state update

Fig. 6

SIGNAL STATE DISPLAY METHOD, TERMINAL AND READABLE STORAGE MEDIUM

CROSS-REFERENCE TO RELATED APPLICATION

This application is a national stage filing under 35 U.S.C. § 371 of international application number PCT/CN2022/089395, filed Apr. 26, 2022, which claims priority to Chinese patent application No. 202110677352.0 filed Jun. 18, 2021. The contents of these applications are incorporated herein by reference in their entirety.

TECHNICAL FIELD

The present disclosure relates to the technical field of wireless communication, and in particular, to a signal state display method, a terminal device, and a readable storage medium.

BACKGROUND

Currently, 5th Generation Mobile Communication Technology (5G) networks are developing rapidly, and 5G networks based on a Non-Standalone (NSA) architecture have been commercialized due to low costs and simple architecture. The NSA architecture adopts a dual-connectivity scheme, i.e., a terminal device can access a Long Term Evolution (LTE) core network and a New Radio (NR) access network at the same time. A process of accessing the NR access network by the terminal device mainly includes that: the terminal device first accesses an LTE cell having an NR reconfiguration capability, and then the LTE cell adds the NR access network to connections of the terminal device through a Radio Resource Control (RRC) reconfiguration message.

In the dual-connection process, the terminal device scans for a 5G signal according to the RRC reconfiguration message from the LTE cell. When detecting a 5G signal, the terminal device initiates a 5G network registration and displays a 5G signal icon; otherwise, the terminal device displays a 4G signal icon. In the above process, the terminal device can display whether the terminal device is currently accessing a 4G signal or a 5G signal at the access stage. However, the duration of signal display is not long enough. For example, if the terminal device has connected to a 5G network, but the LTE mode of the terminal device is in an idle state because there is no continuous service, the network sends an RRC Release message to release network resources. As a result, the 5G mode of the terminal device is also in a deactivated state. In this case, the terminal device cannot detect a 5G signal in real time, cannot determine whether the terminal device is still within coverage of a 5G signal, and can only display a 4G signal. Apparently, this does not meet the requirements of the actual situation.

SUMMARY

The following is a summary of the subject matter set forth in this description. This summary is not intended to limit the scope of protection of the claims.

Embodiments of the present disclosure provide a signal state display method, a terminal device, and a readable storage medium.

In accordance with a first aspect of the present disclosure, an embodiment provides a signal state display method, applied to a user equipment (UE), where the UE is in dual connection with a first-standard network and a second-standard network, and the first-standard network provides the UE with an anchor frequency for accessing the second-standard network. The signal state display method may include: monitoring a signal change value of the UE in a current cell of the first-standard network, in response to the UE being in an idle mode; triggering an access request to cause the UE to establish a connection with the first-standard network, in response to the signal change value being greater than a preset signal threshold; updating a current signal state to a signal state corresponding to the second-standard network, in response to accessing the second-standard network through the anchor frequency of the first-standard network; and continuously displaying the updated signal state until a next signal state update.

In accordance with a second aspect of the present disclosure, an embodiment provides a signal state display method, applied to a UE, where the UE is in dual connection with a first-standard network and a second-standard network, and the first-standard network provides the UE with an anchor frequency for accessing the second-standard network. The signal state display method may include: receiving a paging message sent periodically, in response to the UE being in an idle mode; triggering an access request to cause the UE to establish a connection with the first-standard network, in response to receiving the paging message; updating a current signal state to a signal state corresponding to the second-standard network, in response to accessing the second-standard network through the anchor frequency of the first-standard network; and continuously displaying the updated signal state until a next signal state update.

In accordance with a third aspect of the present disclosure, an embodiment provides a terminal device, which may include at least one processor and a memory communicably connected to the at least one processor, where the memory stores instructions executable by the at least one processor which, when executed by the at least one processor, causes the at least one processor to carry out the signal state display method of the first aspect or the signal state display method of the second aspect.

In accordance with a fourth aspect of the present disclosure, an embodiment further provides a computer-readable storage medium, storing computer-executable instructions which, when executed by a computer, causes the computer to carry out the signal state display method of the first aspect or the signal state display method of the second aspect.

Additional features and advantages of the present disclosure will be set forth in the description which follows, and in part will be apparent from the description, or may be learned by the practice of the present disclosure. The objects and other advantages of the present disclosure can be realized and obtained by the structures particularly pointed out in the description, claims and drawings.

BRIEF DESCRIPTION OF DRAWINGS

The drawings are provided for a further understanding of the technical schemes of the present disclosure, and constitute a part of the description. The drawings and the embodiments of the present disclosure are used to illustrate the technical schemes of the present disclosure, and do not constitute a limitation to the technical schemes of the present disclosure.

FIG. 2 is a flowchart of determining an anchor cell according to an embodiment of the present disclosure;

FIG. 3 is a flowchart of determining a signal change value according to an embodiment of the present disclosure;

FIG. 6 is an overall flowchart of a signal state display method according to an embodiment of the present disclosure;

DETAILED DESCRIPTION

Figure 1:
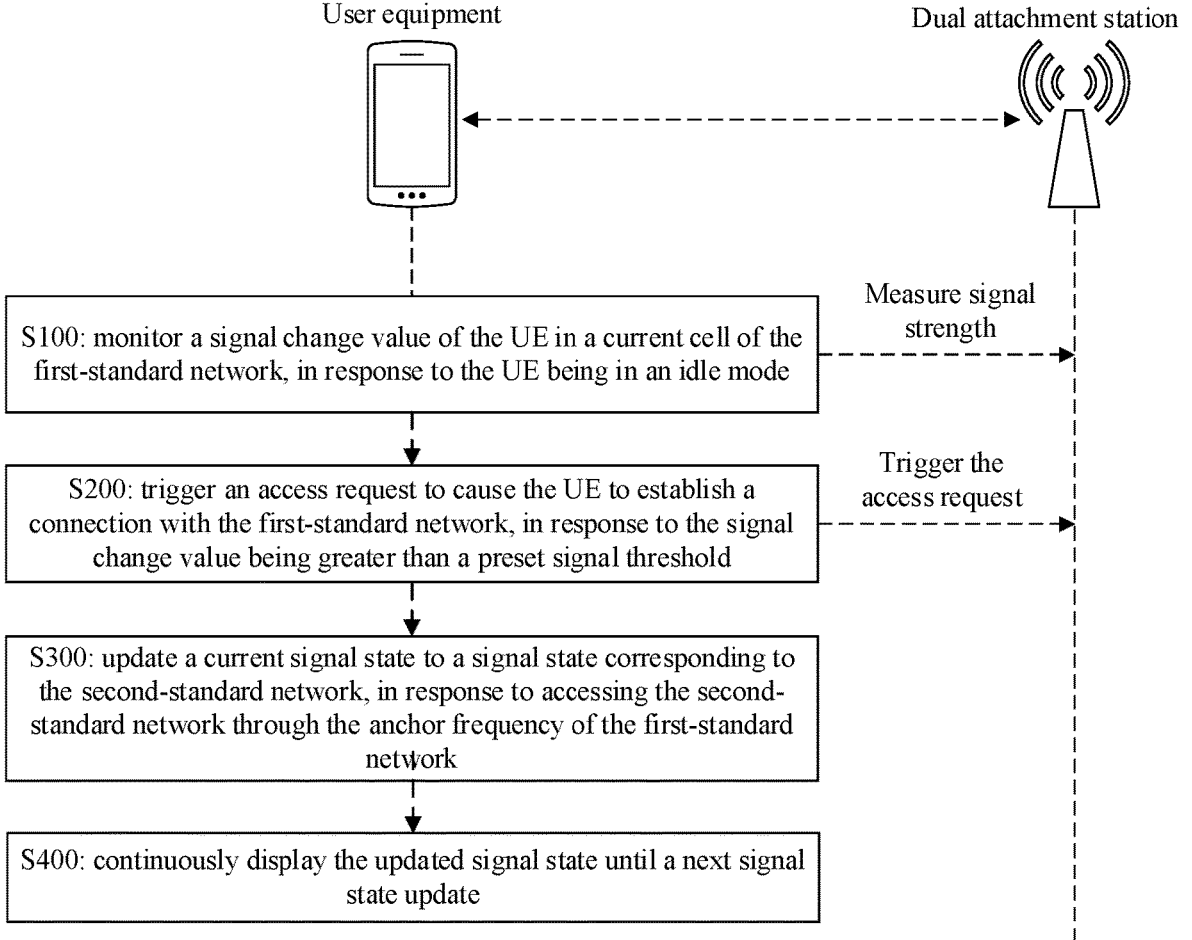
FIG. 1 is an overall flowchart of a signal state display method according to an embodiment of the present disclosure.

To make the objects, technical schemes, and advantages of the present disclosure clear, the present disclosure is described in further detail in conjunction with accompanying drawings and examples. It should be understood that the specific embodiments described herein are merely used for illustrating the present disclosure, and are not intended to limit the present disclosure.

With the development of 5G networks, the 3GPP has proposed a number of networking architecture options for 5G network architectures, which are classified into Stand-alone networking (SA) and Non-Standalone networking (NSA). 5G networks based on the NSA architecture have been commercialized due to low costs and simple architecture. The NSA architecture adopts a dual-connectivity scheme, i.e., an LTE core network and an NR access network. A UE accesses an LTE network and a 5G network at the same time. There are several types of networking based on the NSA architecture. In the most widely used networking architecture, a control plane of the UE accesses the LTE core network and a user plane of the UE accesses the NR access network. The embodiments of the present disclosure are described using the most widely used NSA networking architecture as an example.

The dual-connection process of the UE mainly includes that: the UE first accesses an LTE cell having a capability of reconfiguring the UE to the NR access network, and the LTE cell adds the NR access network to connections of the UE through RRC reconfiguration. Generally, for ease of distinguishing, the LTE cell having the capability of reconfiguring the UE to the NR access network is referred to as an anchor cell, an LTE cell not having the capability of reconfiguring the UE to the NR access network is correspondingly referred to as a non-anchor cell, and the capability of reconfiguring the UE from the anchor cell to the NR access network is referred to as a Dual Connectivity of E-UTRA with NR (ENDC) capability. It can be understood that the anchor cell is not a term provided in protocol standards. In the protocols, for the dual-connectivity technology in NSA networking, an LTE cell is required to provide an anchor point to provide a support point for UE having a 5G access capability to access the NR access network. This point is generally a certain frequency in the LTE cell. The UE accesses the NR access network through frequency conversion according to the anchor frequency.

In an ENDC access process, the UE may need to scan for a 5G signal according to an RRC reconfiguration message from the LTE cell. Only when the UE can detect a 5G signal, the UE initiates a 5G registration and displays a signal state corresponding to the 5G network. When the UE cannot detect a 5G signal, it means that there is no 5G signal around the UE, and the UE can only camp on the anchor cell, remain in an LTE access state, and display a signal state corresponding to the LTE network.

When there is no continuous service after the UE accesses the NR access network, the network delivers an RRC Release message to release network resources, and the UE enters an idle mode, at which time the 5G connection is also released. In this case, even if the UE is still within coverage of the 5G network, the UE can only display the signal state corresponding to the LTE network, and apparently cannot accurately present the 5G coverage area to the user.

Therefore, embodiments of the present disclosure provide a signal state display method, a terminal device, and a readable storage medium. To solve the problem that the UE in the idle mode cannot accurately preset the current network coverage status, two means of measurement in the idle mode are provided. The current network coverage status is determined according to a measurement result, and a corresponding signal state is continuously displayed, to prevent the UE from changing the displayed signal state again after re-entering the idle mode.

Referring to FIG. 1, an embodiment of the present disclosure provides a signal state display method, applied to a UE. The UE is in dual connection with a first-standard network and a second-standard network, and the first-standard network provides the UE with an anchor frequency for accessing the second-standard network. The signal state display method includes, but not limited to, the followings steps S100, S200, S300, and S400.

At S100, a signal change value of the UE in a current cell of the first-standard network is monitored when the UE is in an idle mode.

At S200, an access request is triggered to cause the UE to establish a connection with the first-standard network when the signal change value is greater than a preset signal threshold.

At S300, a current signal state is updated to a signal state corresponding to the second-standard network when accessing the second-standard network through the anchor frequency of the first-standard network.

At S400, the updated signal state is continuously displayed until a next signal state update.

In related technologies, when the UE completes a random access process or carries out continuous service in the LTE cell, the UE enters a connected mode. In the connected mode, the UE has established an RRC connection with a base station corresponding to the LTE cell, and stores an RRC context of the UE. In the connected mode, the UE can capture a system message, perform measurement and measurement reporting, send and receive data to and from the network, monitor a control channel, and so on. When the UE subsequently camps on the LTE cell and disconnects the service connection for a period of time, the network actively sends an RRC Release message to the UE to release network resources. The UE in the idle mode does not have an RRC context on the base station, but has a context in a Mobility Management Entity (MME), and does not have an RRC connection with the base station. The UE in the idle mode can receive a system information broadcast, monitor a paging channel, perform cell reselection, and so on.

For convenience of description, the embodiments of the present disclosure are described using an example where the first-standard network is an LTE network and the second-standard network is a 5G network. In order to accurately present a coverage signal of the 5G network, the UE monitors a signal value of the LTE network in the idle mode. When detecting that the signal change value is greater than the preset signal threshold, it is considered that the UE has moved a certain distance and may have left or entered a coverage range of the 5G signal. Therefore, the UE initiates an access request to the LTE network, and on the premise of determining that the LTE cell is an anchor cell, the UE attempts to perform dual connection. When successfully connecting to the 5G network, a signal state currently displayed by the UE is updated to a signal state corresponding to the 5G network. Due to the initiation of the access request, the UE has switched from the idle mode to the connected mode. To prevent the UE from automatically changing the signal state corresponding to the 5G network into the signal state corresponding to the LTE network when subsequently switching from the connected mode to the idle mode, in the embodiments of the present disclosure, the signal state corresponding to the 5G network is continuously displayed, until the signal state is updated by means of, for example signal measurement, next time. It can be understood that the signal state corresponding to the LTE network may be a 4G icon, an LTE icon, etc., and the signal state corresponding to the 5G network may be a 5G icon, an NR icon, etc. The form of the icon is not limited in the present disclosure.

With the above method, even if the UE subsequently switches from the connected mode to the idle mode, it can be considered that the UE is still with coverage of the 5G network as long as the signal change value of LTE does not exceed the preset signal threshold, thereby providing an accurate indication of 5G signal coverage for the user.

It can be understood that even if the UE triggers an access request to establish a connection with the anchor cell, the UE may not be able to connect to the 5G network through the anchor frequency, because the coverage range of the 5G signal is often smaller than that of the 4G signal. When the UE is within coverage of the LTE network but not within coverage of the NR access network, the UE cannot detect the 5G signal during the dual-connection process, and the UE can only display the signal state corresponding to the LTE network. In other words, when the access to the second-standard network through the anchor frequency of the first-standard network fails, the current signal state is updated to the signal state corresponding to the first-standard network.

As for the anchor cell determination, a commonly used method is to determine whether the current LTE cell is an anchor cell depending on whether a system information block (SIB2) message sent by the LTE cell contains a field "upperLayerIndication-r15". However, this field is not required to be broadcast by the network according to protocols. Networks provided by some equipment vendors do not display this field, and the anchor cell may not be indicated by this field. Therefore, to determine whether the current LTE cell is an anchor cell, an embodiment of the present disclosure provides a method for determining an anchor cell, which may be implemented by executing the following steps, as shown in FIG. 2.

In a step of S501, a system message sent by the first-standard network is received.

In a step of S502, when the system message contains an NSA capability indication field, it is determined according to the NSA capability indication field whether the first-standard network provides the anchor frequency.

In a step of S503, when the system message does not contain the NSA capability indication field, it is determined whether the first-standard network provides the anchor frequency depending on whether a measurement event or a reconfiguration message delivered by the first-standard network is received.

In protocol standards commonly used at present, LTE system messages include a master information block (MIB), SIB1, SIB2, etc. The SIB2 message generally contain a parameter for determining whether a cell is suitable for cell selection, and other time-domain scheduling information, etc. According to the upperLayerIndication-r15 field currently defined in the 3GPP protocols, a value of "true" is used to indicate that the current LTE cell supports the ENDC function. Of course, the upperLayerIndication-r15 field is not mandatory. In the case of other protocols, the upperLayerIndication-r15 field may not exist or other fields may be used instead. Therefore, in S501 and S502, it is illustrated in a general way that according to the NSA capability indication field in the system message delivered by the LTE cell, the UE can learn that the current LTE cell is an anchor cell. If there is no NSA capability indication field in the system message, the LTE cell having the ENDC capability can still reconfigure the UE to the 5G network. It is apparent that the reconfiguration of the UE to the 5G network requires measuring the 5G signal to determine the signal strength. Therefore, from the perspective of this process, when the UE receives a measurement event or a reconfiguration message from the LTE cell, it indicates that the LTE cell is an anchor cell. It can be understood that there are various LTE measurement events, and a B1 event in 3GPP TS 38.331 is usually used. On the other hand, when the UE receives an RRC reconfiguration message, it also indicates that the current LTE cell is an anchor cell.

It can be understood that the process of determining an anchor cell not only can be applied to the UE in the idle mode, and the above steps S501 to S503 can also be executed during a random access of the UE to the LTE network to determine an anchor cell.

The above operation S100 and S200 actually indicate that a basis of displaying the signal state corresponding to the second-standard network is whether currently the UE is still within coverage of the 5G signal, and therefore a distance by which the terminal device moves is determined according to the magnitude of the LTE signal change value measured by the UE. Referring to FIG. 3, the monitoring of the signal change value in S100 may be implemented by executing the following steps.

In a step of S110, a first signal strength and a second signal strength of the UE in the current cell of the first-standard network are acquired successively according to a preset monitoring time interval.

In a step of S120, the signal change value is determined according to the first signal strength and the second signal strength.

In the idle mode, the UE can continuously measure the signal strength of the LTE signal. Generally, when the UE stays at a location and does not move, the measured LTE signal strength does not change greatly. Only when the UE moves by a distance exceeding a threshold, the measured LTE signal strength changes greatly. The access request is triggered only when the change exceeds the preset signal threshold. In this process, the UE successively measures the first signal strength and the second signal strength according to a preset time interval, and calculates the signal change value according to the first signal strength and the second signal strength. It is to be noted that in a case where the LTE signal strength changes slowly due to slow movement of the UE, the UE may use two signal values measured at multiple consecutive time intervals, to calculate the signal change value.

In some cases where the UE moves out of the current LTE cell, before the signal change value is determined, it may need to be determined whether the UE is still in the same LTE cell. Therefore, after the first signal value and the second signal value are acquired through the above step S110, referring to FIG. 4, the following steps are further executed.

In a step of S111, a first cell identifier corresponding to the first signal strength and a second cell identifier corresponding to the second signal strength are determined.

In a step of S112, a random access request is sent to a cell corresponding to the second cell identifier when the first cell identifier is different from the second cell identifier.

Generally, it is determined according to the cell identifier of the LTE cell whether the UE is still in the same LTE cell. When the cell identifier of the LTE cell changes, it indicates that the UE has moved out of the current LTE cell and entered a next LTE cell. It can be seen from the results of the two signal measurements that in the two signal strength measurements, the LTE cell that the UE is currently in can be determined. Once the cell identifiers obtained in the two measurements are different, it may need to be determined whether the next LTE cell is an anchor cell, and then the subsequent dual-connection process is performed.

Figure 5:
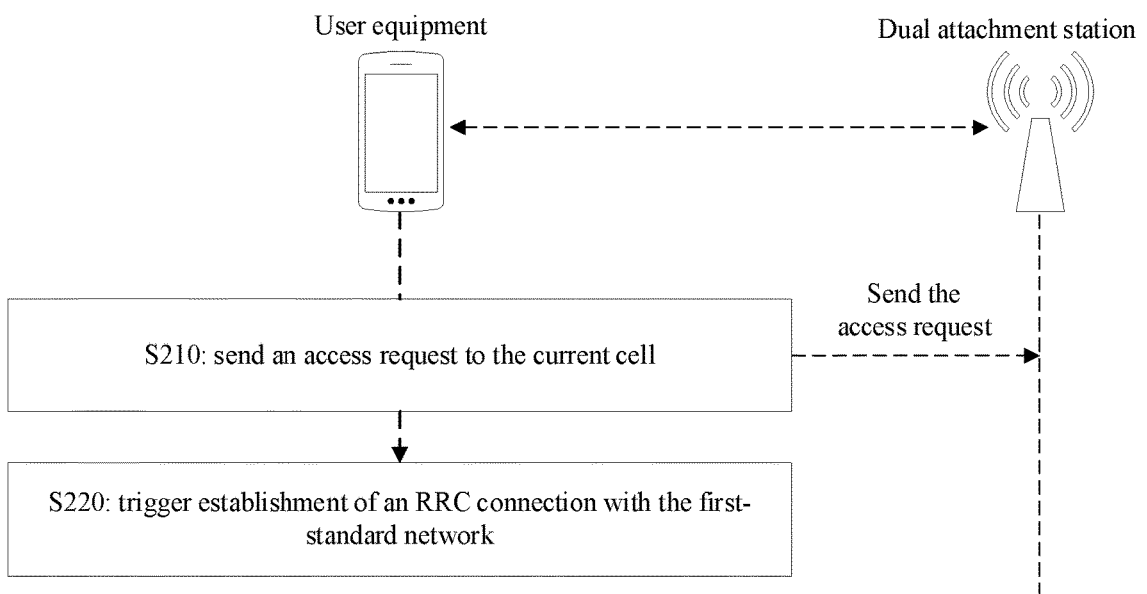
FIG. 5 is a flowchart of triggering an access request according to an embodiment of the present disclosure.

Referring to FIG. 5, the triggering of the access request in S200 may be implemented by executing the following steps.

In a step of S210, an access request is sent to the current cell, where the access request is a data service request or a random access request.

In a step of S220, establishment of an RRC connection with the first-standard network is triggered.

When detecting that the signal change value exceeds the preset signal threshold, the UE triggers a service to establish an RRC connection with the first-standard network. Only after the RRC connection is established, the UE can attempt to connect to the second-standard network through the first-standard network. It can be understood that the establishment of the RRC connection may be triggered in various manners. For example, the UE may generate a data service to trigger the establishment of the RRC connection, or may trigger a random access service to trigger the establishment of the RRC connection.

In addition to the above method of measuring the coverage range of the 5G signal according to the change value of signal strength, the coverage range of the 5G signal may also be measured according to a paging message periodically sent by a base station side.

Referring to FIG. 6, an embodiment of the present disclosure further provides a signal state display method, applied to a UE. The UE is in dual connection with a first-standard network and a second-standard network, and the first-standard network provides the UE with an anchor frequency for accessing the second-standard network. The signal state display method includes, but not limited to, steps S600, S700, S800, and S900.

At S600, a paging message sent periodically is received when the UE is in an idle mode.

At S700, an access request is triggered to cause the UE to establish a connection with the first-standard network when receiving the paging message.

At S800, a current signal state is updated to a signal state corresponding to the second-standard network when accessing the second-standard network through the anchor frequency of the first-standard network.

At S900, the updated signal state is continuously displayed until a next signal state update.

In this embodiment, the base station side periodically sends a paging message to trigger the access request of the UE. When the UE is in the idle mode and receives the paging message sent by the base station, the UE automatically triggers the access request to connect to the first-standard network. If a reconfiguration of the UE to the second-standard network through the first-standard network is successful, the UE may update the current signal state to the signal state corresponding to the second-standard network. The signal display process is the same as that in the above embodiments, so the details will not be repeated herein.

Similarly, when the access of the UE to the second-standard network through the anchor frequency of the first-standard network fails, the current signal state is updated to the signal state corresponding to the first-standard network.

Figure 7:
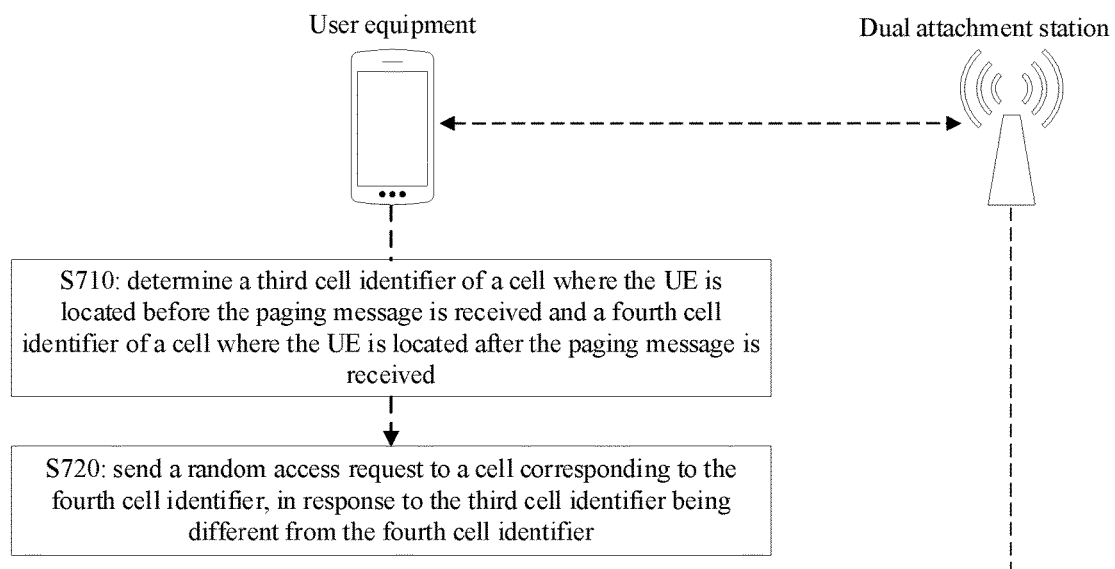
FIG. 7 is a flowchart of determining whether a cell ID changes according to an embodiment of the present disclosure.

It can be understood that after receiving the paging message and before initiating the access request, the UE may still need to determine whether the UE is still in the current LTE cell, which may be implemented by executing the following steps, as shown in FIG. 7.

In a step of S710, a third cell identifier of a cell where the UE is located before the paging message is received and a fourth cell identifier of a cell where the UE is located after the paging message is received are determined.

At S720, a random access request is sent to a cell corresponding to the fourth cell identifier when the third cell identifier is different from the fourth cell identifier.

In the scheme using the paging message to trigger the access request, the UE measures the cell identifier of the LTE cell. When receiving the paging message, the UE determines two cell identifiers before and after the paging message is received, and determines whether the LTE cell has changed. If detecting that the cell identifier of the LTE cell changes, the UE may need to access to the latter LTE cell, and therefore initiates a random access process.

Similarly, the above access request may trigger the establishment of the RRC connection in different manners. For example, referring to FIG. 8, the following steps are executed.

In a step of S730, an access request is sent to the current cell, where the access request is a data service request or a random access request.

In a step of S740, establishment of an RRC connection with the first-standard network is triggered.

In the above two embodiments, to solve the problem of inaccurate display of signal states of two network standards on a dual-connected UE in the NSA architecture and the problem that the UE in the idle mode cannot monitor the network signal state, a scheme is provided, where when the UE switches from the connected mode to the idle mode or is currently in the idle mode (disconnected from the current network), the UE monitors a signal of the first-standard network or receives a paging message periodically sent by the first-standard network, and automatically triggers an access request. In this way, the UE may attempt to perform dual connection. When successfully connecting to the 5G network through the LTE network, the UE continuously displays the signal state corresponding to the 5G network.

When the connection of the UE to the 5G network fails, the UE continuously displays the signal state corresponding to the LTE network, until the signal state is updated next time. With this method, the problem that the signal state corresponding to the 5G network cannot be displayed even if the UE is located within coverage of the 5G network when the UE is in the idle mode is solved, and the 5G coverage area can be determined more accurately.

The signal state display method of the embodiments of the present disclosure will be described below using three examples.

Example One

Figure 9:
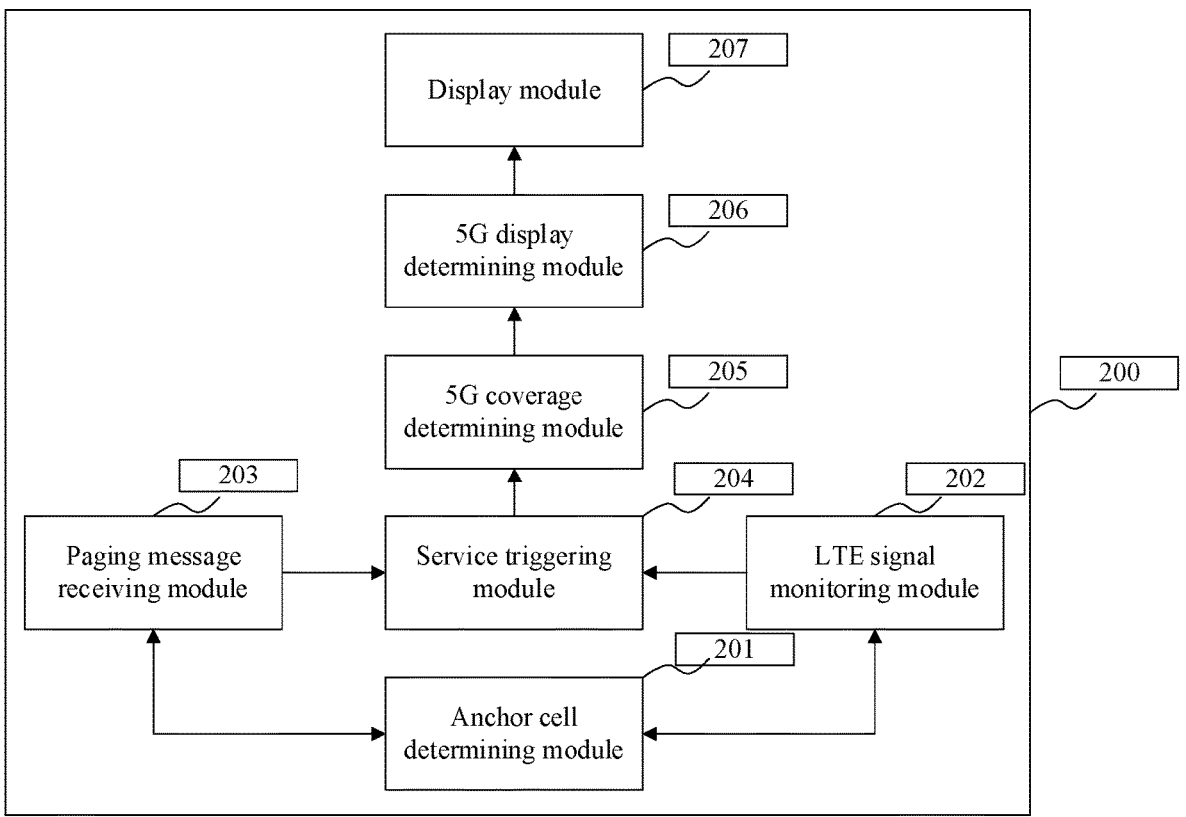
FIG. 9 is a structural connection diagram of a device according to Example One of the present disclosure.

This example provides a terminal device for displaying a 5G signal state in a UE in an NSA network. As shown in FIG. 9, the terminal device 200 includes an anchor cell determining module 201, an LTE signal monitoring module 202, a paging message receiving module 203, a service triggering module 204, a 5G coverage determining module 205, a 5G display determining module 206, and a display module 207.

The anchor cell determining module 201 is configured for determining, depending on whether an LTE cell with which the UE is registered delivers an NR reconfiguration message or an NR measurement event message, whether the current LTE cell is an anchor cell.

The LTE signal monitoring module 202 is configured for operating only in an anchor cell, and when an LTE signal change value of the UE in the anchor cell exceeds a preset signal threshold, sending a message to the service triggering module 204. This module is further configured for monitoring whether a cell identifier of the LTE cell changes, and if the cell identifier of the LTE cell changes, instructing the anchor cell determining module 201 to determine whether the cell after the change is an anchor cell.

The paging message receiving module 203 is configured for operating only in the anchor cell, and when receiving a paging message sent by an LTE network, sending a message to the service triggering module 204.

The service triggering module 204 is configured for triggering a service according to the message sent by the LTE signal monitoring module 202 or the paging message receiving module 203, such that the UE initiates an RRC Connect Request message, and executes NR signal measurement and attempts to access an NR access network.

The 5G coverage determining module 205 is configured for determining whether the UE is currently within coverage of a 5G signal according to an NR signal measured during the execution of the service triggering module 204 and according to whether the access to the NR access network is successful.

The 5G display determining module 206 is configured for determining whether 5G is currently displayed on the UE according to a result reported by the 5G coverage determining module and a 5G display requirement. For signal display requirements of some UEs, the UE is required to display a 5G icon upon entering an anchor cell, while for some other UEs, the UE is required to display a 5G icon only after entering a coverage range of the 5G signal.

The display module 207 is configured for updating current standard information (5G or 4G) according to information reported by the 5G display determining module 206, where the display state is maintained until next time the 5G display determining module 206 reports information. In other words, the currently displayed standard information (5G or 4G) is a last determining result from the 5G display determining module 206, and the display module 207 does not update the displayed standard information (4G or 5G) within a time interval between the two determining results.

Example Two

Figure 10:
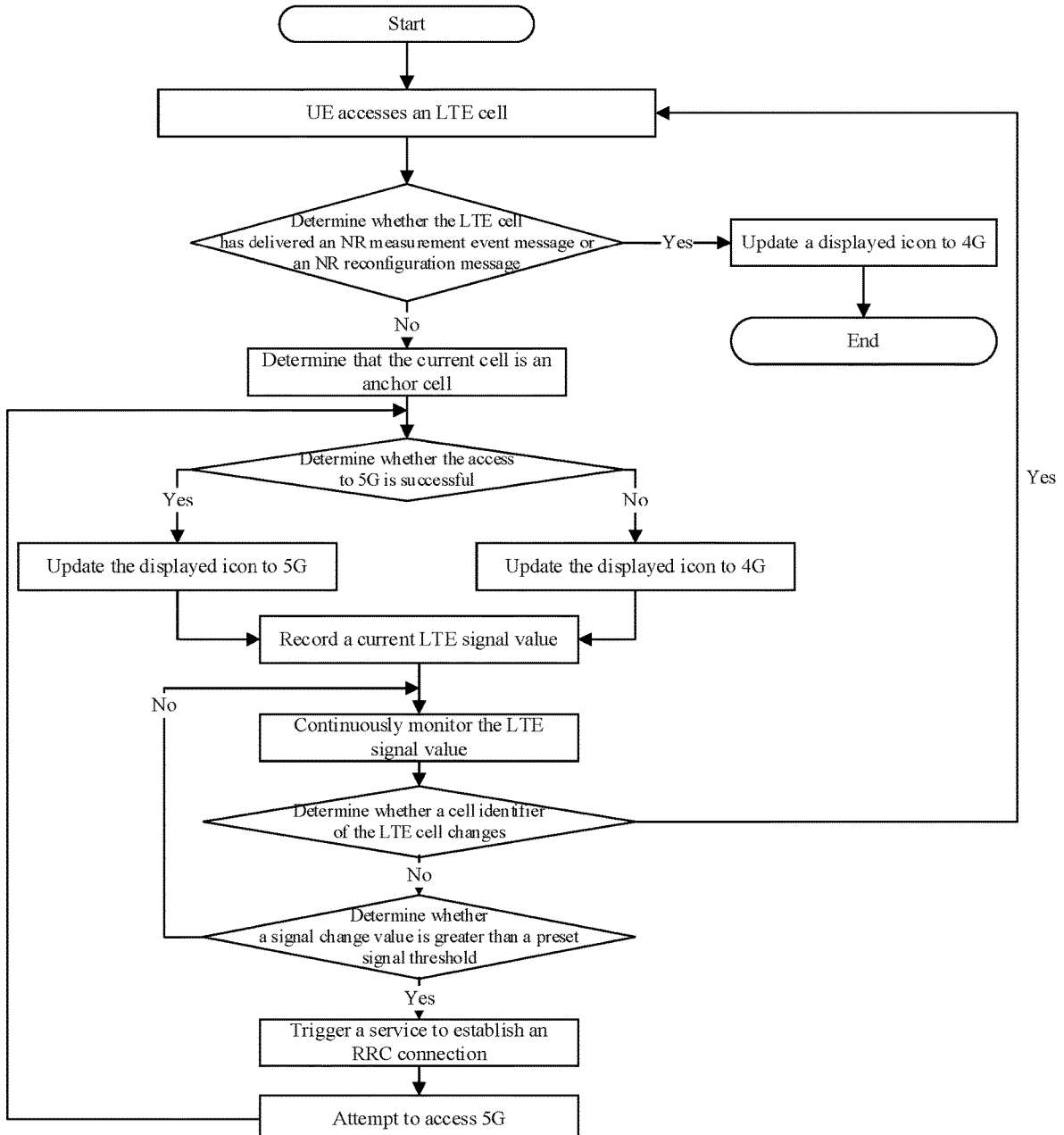
FIG. 10 is a flowchart of a signal state display method according to Example Two of the present disclosure.

This example provides a method for displaying a signal state using the device 200 of Example One. Referring to FIG. 10, the method includes the following steps.

In a step of S301, the process starts.

In a step of S302, a UE is powered on and accesses an LTE cell.

In a step of S303, the UE determines in the cell whether the network has delivered an NR measurement event (e.g., a B1 event in 3GPP TS 38.331) message or an NR reconfiguration message. This step is executed by the anchor cell determining module 201 in the device 200.

In a step of S304, when it is determined in S303 that the cell has delivered the NR reconfiguration message or the NR measurement event message, it is determined that the current cell is an anchor cell.

In a step of S305, it is determined whether an attempt of the UE in the anchor cell to access 5G is successful. This step is executed by the 5G coverage determining module 205 in the device 200.

In a step of S306, when the access to 5G is successful, a displayed standard icon is updated to 5G. This step is executed by the 5G display determining module 206 and the display module 207 in the device 200.

In a step of S307, when the access to 5G fails, the displayed standard icon is updated to 4G. This step is executed by the 5G display determining module 206 and the display module 207 in the device 200.

In a step of S308, regardless of whether the access to 5G is successful, a current LTE signal value is recorded. This step is executed by the LTE signal monitoring module 202 in the device 200.

In a step of S309, an LTE signal value change is continuously monitored, and at the same time, it is monitored whether a cell identifier of the LTE cell changes. This step is executed by the LTE signal monitoring module 202 in the device 200.

In a step of S310, it is determined whether the cell identifier of the LTE cell has changed, and if the cell identifier of the LTE cell has changed, S303 is executed to determine whether the LTE cell after the change is an anchor cell.

In a step of S311, it is determined whether a difference between a current LTE signal value and the signal value recorded in S309 is greater than a preset signal threshold. If the difference between the current LTE signal value and the signal value recorded in S309 is not greater than the preset signal threshold, S309 is executed to continuously monitor the LTE signal value. This step is executed only when it is determined in S310 that the cell identifier of the LTE cell has not changed, and is executed by the LTE signal monitoring module 202 in the device 200.

In a step of S312, when it is determined in S311 that the difference between the current LTE signal value and the signal value recorded in S309 is greater than the preset signal threshold, a service (a data service, a random access service, or other services capable of triggering establishment of an RRC connection) is triggered to establish an RRC connection. This step is executed by the service triggering module 204 in the device 200.

In a step of S313, after the RRC connection is established in S312, the UE attempts to access 5G. This step is executed by the service triggering module 204 in the device 200. Then, S305 is executed to determine whether the access to 5G is successful.

In a step of S314, if it is determined in S303 that the cell has not delivered the NR reconfiguration message or the NR measurement event message, the displayed standard icon is updated to 4G, i.e., it is determined that the current cell is not an anchor cell and the terminal device cannot access 5G, and then S315 is executed.

In a step of S315, the process ends.

Example Three

Figure 11:
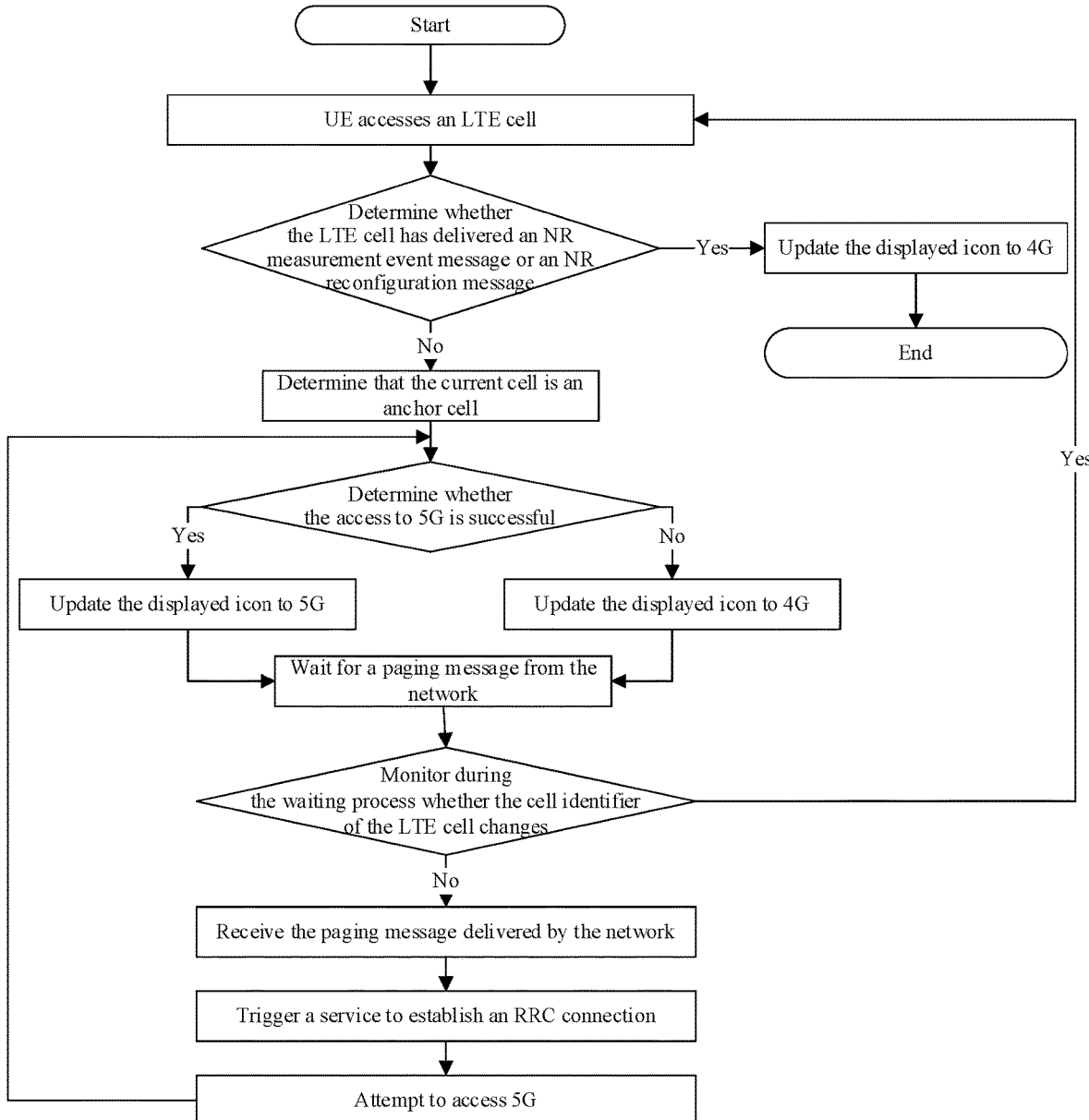
FIG. 11 is a flowchart of a signal state display method according to Example Three of the present disclosure.

This example provides a method for displaying a signal state using the device 200 of Example One. Referring to FIG. 11, the method includes the following steps.

In a step of S401, the process starts.

In a step of S402, a UE is powered on and accesses an LTE cell.

In a step of S403, the UE determines in the cell whether the network has delivered an NR measurement event (e.g., a B1 event in 3GPP TS 38.331) message or an NR reconfiguration message. This step is executed by the anchor cell determining module 201 in the device 200.

In a step of S404, when it is determined in S403 that the cell has delivered the NR reconfiguration information or the NR measurement event, it is determined that the current cell is an anchor cell.

In a step of S405, it is determined whether an attempt of the UE in the anchor cell to access 5G is successful. This step is executed by the 5G coverage determining module 205 in the device 200.

In a step of S406, when the access to 5G is successful, a displayed standard icon is updated to 5G. This step is executed by the 5G display determining module 206 and the display module 207 in the device 200.

In a step of S407, when the access to 5G fails, the displayed standard icon is updated to 4G. This step is executed by the 5G display determining module 206 and the display module 207 in the device 200.

In a step of S408, regardless of whether the access to 5G is successful, the UE waits for a paging message sent by the network. This step is executed by the paging message receiving module 203 in the device 200.

In a step of S409, while waiting for the paging message sent by the network, the UE continuously determines whether the cell identifier of the LTE cell has changed, and if the cell identifier of the LTE cell has changed, S403 is executed to determine whether the LTE cell after the change is an anchor cell. This step is executed by the LTE signal monitoring module 202 in the device 200.

In a step of S410, the terminal device receives the paging message sent by the network. This step is executed by the paging message receiving module 203 in the device 200.

In a step of S411, after receiving the paging message from the network, an access service is triggered to establish an RRC connection. This step is executed by the service triggering module 204 in the device 200.

In a step of S412, after the RRC connection is established in S411, the UE attempts to access 5G. This step is executed by the service triggering module 204 in the device 200. Then, S405 is executed to determine whether the access to 5G is successful.

In a step of S413, if it is determined in S403 that the cell has not delivered the NR reconfiguration message or the NR measurement event message, the displayed standard icon is updated to 4G, i.e., it is determined that the current cell is not an anchor cell and the terminal device cannot access 5G, and then S414 is executed.

In a step of S414, the process ends.

An embodiment of the present disclosure further provides a terminal device, including at least one processor and a memory communicably connected to the at least one processor, where the memory stores instructions executable by the at least one processor which, when executed by the at least one processor, causes the at least one processor to carry out the signal state display method.

Figure 12:
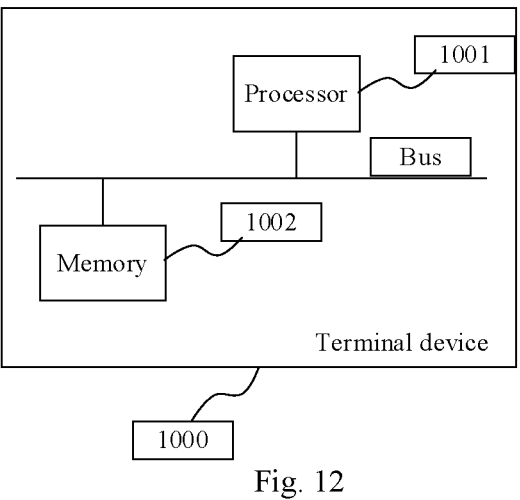
FIG. 12 is a schematic structural diagram of a terminal device according to an embodiment of the present disclosure.

Referring to FIG. 12, a control processor 1001 and a memory 1002 in a terminal device 1000 may be connected for example via a bus. The memory 1002, as a non-transitory computer-readable storage medium, may be configured for storing a non-transitory software program and a non-transitory computer-executable program. In addition, the memory 1002 may include a high speed random access memory, and may also include a non-transitory memory, e.g., at least one magnetic disk storage device, flash memory device, or other non-transitory solid-state storage device. In some implementations, the memory 1002 optionally includes memories located remotely from the control processor 1001, and the remote memories may be connected to the terminal device 1000 via a network. Examples of the network include, but not limited to, the Internet, an intranet, a local area network, a mobile communication network, and combinations thereof.

Those having ordinary skills in the art may understand that the device structure shown in FIG. 12 does not constitute a limitation to the terminal device 1000, and the terminal device may include more or fewer components than those shown in the figure, or some components may be combined, or a different component arrangement may be used.

Figure 4:
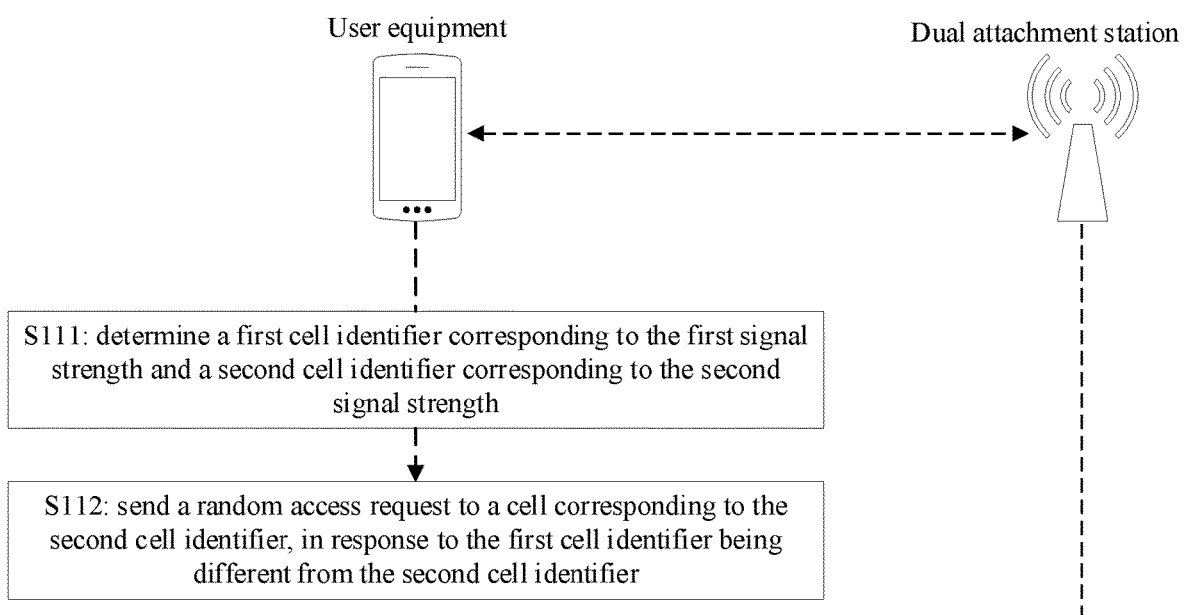
FIG. 4 is a flowchart of determining whether a cell identifier (ID) changes according to an embodiment of the present disclosure.
Figure 8:
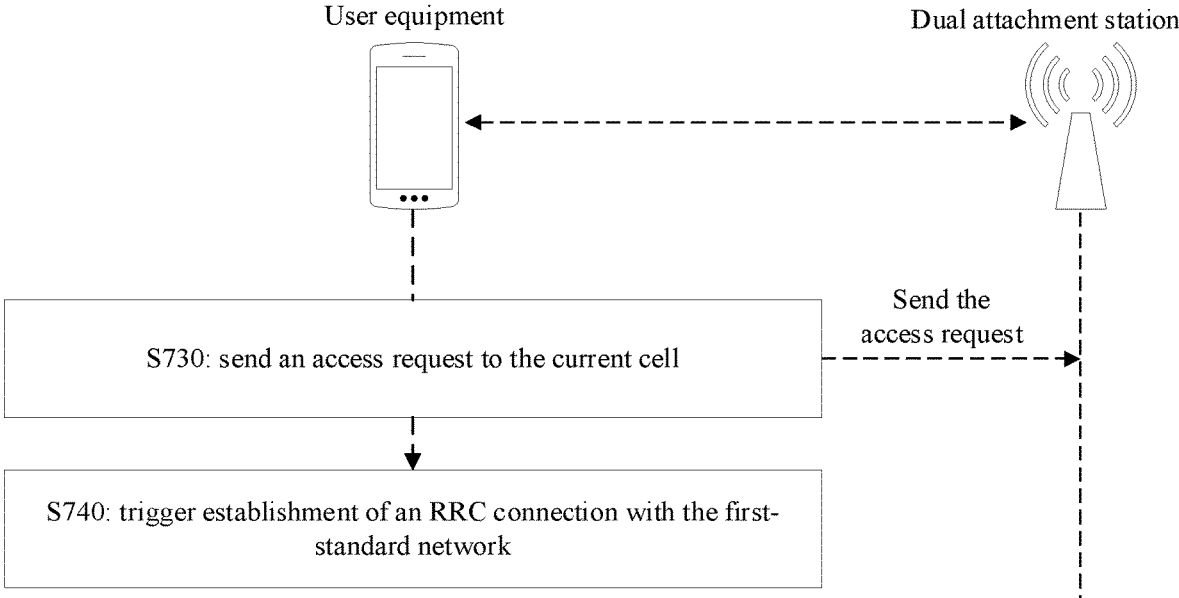
FIG. 8 is a flowchart of triggering an access request according to an embodiment of the present disclosure.

An embodiment of the present disclosure further provides a computer-readable storage medium, storing computer-executable instructions which, when executed by one or more control processors, for example, by a control processor 1001 in FIG. 12, may cause the one or more control processors to implement the signal state display method in the above method embodiments, for example, execute the method steps S100 to S400 in FIG. 1, the method steps S501 to S502 in FIG. 2, the method steps S110 to S120 in FIG. 3, the method steps S111 to S112 in FIG. 4, the method steps S210 to S220 in FIG. 5, the method steps S600 and S900 in FIG. 6, the method steps S710 and S720 in FIG. 7, or the method steps S730 and S740 in FIG. 8.

The signal state display method provided in the embodiments of the present disclosure at least has the following beneficial effects. In the embodiments of the present disclosure, to solve the problem of inaccurate display of signal states of two network standards on a dual-connected UE in the NSA architecture and the problem that the UE in the idle mode cannot monitor the network signal state, a scheme is provided, where when the UE switches from the connected mode to the idle mode or is currently in the idle mode (disconnected from the current network), the UE monitors a signal of the first-standard network or receives a paging message periodically sent by the first-standard network, and automatically triggers an access request. In this way, the UE may attempt to perform dual connection. When successfully connecting to the 5G network through the LTE network, the UE continuously displays the signal state corresponding to the 5G network. When the connection of the UE to the 5G network fails, the UE continuously displays the signal state corresponding to the LTE network, until the signal state is updated next time. With this method, the problem that the signal state corresponding to the 5G network cannot be displayed even if the UE is located within coverage of the 5G network when the UE is in the idle mode is solved, and it can be determined more accurately whether the UE is within coverage of the 5G network.

The device embodiments described above are merely examples. The units described as separate components may or may not be physically separated, i.e., may be located in one place or may be distributed over a plurality of network units. Some or all of the modules may be selected according to actual needs to achieve the objects of the scheme of this embodiment.

Those having ordinary skills in the art can understand that all or some of the steps in the methods disclosed above and the functional modules/units in the system and the device can be implemented as software, firmware, hardware, and appropriate combinations thereof. Some or all physical components may be implemented as software executed by a processor, such as a central processing unit, a digital signal processor, or a microprocessor, or as hardware, or as an integrated circuit, such as an application-specific integrated circuit. Such software may be distributed on a computer-readable medium, which may include a computer storage medium (or non-transitory medium) and a communication medium (or transitory medium). As is known to those having ordinary skills in the art, the term "computer storage medium" includes volatile and nonvolatile, removable and non-removable media implemented in any method or technology for storage of information (such as computer-readable instructions, data structures, program modules, or other data). The computer storage medium includes, but not limited to, a Random Access Memory (RAM), a Read-Only Memory (ROM), an Electrically Erasable Programmable Read-Only Memory (EEPROM), a flash memory or other memory technology, a Compact Disc Read-Only Memory (CD-ROM), a Digital Versatile Disc (DVD) or other optical storage, a cassette, a magnetic tape, a magnetic disk storage or other magnetic storage device, or any other medium which can be used to store the desired information and which can be accessed by a computer. In addition, as is known to those having ordinary skills in the art, the communication medium typically includes computer-readable instructions, data structures, program modules, or other data in a modulated data signal such as a carrier or other transport mechanism, and can include any information delivery medium.

Although some implementations of the present disclosure have been described above, the present disclosure is not limited to the implementations described above. Those having ordinary skills in the art can make various equivalent modifications or replacements without departing from the scope of the present disclosure. Such equivalent modifications or replacements fall within the scope defined by the claims of the present disclosure.

What is claimed is:

1. A signal state display method, applied to a user equipment (UE), wherein the UE is in dual connection with a first-standard network and a second-standard network, and the first-standard network provides the UE with an anchor frequency for accessing the second-standard network, the signal state display method comprising:

monitoring a signal change value of the UE in a current cell of the first-standard network, in response to the UE being in an idle mode;

14 triggering an access request to cause the UE to establish a connection with the first-standard network, in response to the signal change value being greater than a preset signal threshold;

updating a current signal state to a signal state corresponding to the second-standard network, in response to accessing the second-standard network through the anchor frequency of the first-standard network; and continuously displaying the updated signal state until a next signal state update.

2. The signal state display method of claim 1, further comprising:

updating a current signal state to a signal state corresponding to the first-standard network, in response to a failure of accessing the second-standard network through the anchor frequency of the first-standard network.

3. The signal state display method of claim 1, wherein monitoring a signal change value of the UE in a current cell of the first-standard network comprises:

acquiring, successively according to a preset monitoring time interval, a first signal strength and a second signal strength of the UE in the current cell of the first-standard network; and determining the signal change value according to the first signal strength and the second signal strength.

4. The signal state display method of claim 3, wherein after acquiring the first signal strength and the second signal strength, the method further comprises:

determining a first cell identifier corresponding to the first signal strength and a second cell identifier corresponding to the second signal strength; and sending a random access request to a cell corresponding to the second cell identifier, in response to the first cell identifier being different from the second cell identifier.

5. The signal state display method of claim 1, wherein triggering an access request to cause the UE to establish a connection with the first-standard network comprises:

sending an access request to the current cell, wherein the access request is a data service request or a random access request; and triggering establishment of a Radio Resource Control (RRC) connection with the first-standard network.

6. The signal state display method of claim 1, wherein before accessing the second-standard network through the anchor frequency of the first-standard network, the method further comprises:

receiving a system message sent by the first-standard network;

in response to the system message containing a Non-Standalone (NSA) capability indication field, determining according to the NSA capability indication field whether the first-standard network provides the anchor frequency; and in response to the system message not containing the NSA capability indication field, determining whether the first-standard network provides the anchor frequency depending on whether a measurement event or a reconfiguration message delivered by the first-standard network is received.

7. A signal state display method, applied to a user equipment (UE), wherein the UE is in dual connection with a first-standard network and a second-standard network, and the first-standard network provides the UE with an anchor frequency for accessing the second-standard network, the signal state display method comprising:

receiving a paging message sent periodically, in response to the UE being in an idle mode;

triggering an access request to cause the UE to establish a connection with the first-standard network, in response to receiving the paging message;

updating a current signal state to a signal state corresponding to the second-standard network, in response to accessing the second-standard network through the anchor frequency of the first-standard network; and continuously displaying the updated signal state until a next signal state update.

8. The signal state display method of claim 7, further comprising:

updating a current signal state to a signal state corresponding to the first-standard network, in response to a failure of accessing the second-standard network through the anchor frequency of the first-standard network.

9. The signal state display method of claim 7, wherein after receiving the paging message, the method further comprises:

determining a third cell identifier of a cell where the UE is located before the paging message is received and a fourth cell identifier of a cell where the UE is located after the paging message is received; and sending a random access request to the cell corresponding to the fourth cell identifier, in response to the third cell identifier being different from the fourth cell identifier.

10. The signal state display method of claim 7, wherein triggering an access request to cause the UE to establish a connection with the first-standard network comprises:

sending an access request to the current cell, wherein the access request is a data service request or a random access request; and triggering establishment of a Radio Resource Control (RRC) connection with the first-standard network.

11. The signal state display method of claim 7, wherein before accessing the second-standard network through the anchor frequency of the first-standard network, the method further comprises:

receiving a system message sent by the first-standard network;

in response to the system message containing a Non-Standalone (NSA) capability indication field, determining according to the NSA capability indication field whether the first-standard network provides the anchor frequency; and in response to the system message not containing the NSA capability indication field, determining whether the first-standard network provides the anchor frequency depending on whether a measurement event or a reconfiguration message delivered by the first-standard network is received.

12. A terminal device, comprising at least one processor and a memory communicably connected to the at least one processor, wherein the memory stores instructions executable by the at least one processor which, when executed by the at least one processor, causes the at least one processor to carry out a signal state display method, applied to a user equipment (UE), wherein the UE is in dual connection with a first-standard network and a second-standard network, and the first-standard network provides the UE with an anchor frequency for accessing the second-standard network, the signal state display method comprising:

monitoring a signal change value of the UE in a current cell of the first-standard network, in response to the UE being in an idle mode;

triggering an access request to cause the UE to establish a connection with the first-standard network, in response to the signal change value being greater than a preset signal threshold;

updating a current signal state to a signal state corresponding to the second-standard network, in response to accessing the second-standard network through the anchor frequency of the first-standard network; and continuously displaying the updated signal state until a next signal state update.

13. A non-transitory computer-readable storage medium, storing computer-executable instructions which, when executed by a computer, causes the computer to carry out the signal state display method of claim 1.

14. A non-transitory computer-readable storage medium, storing computer-executable instructions which, when executed by a computer, causes the computer to carry out the signal state display method of claim 2.

15. A non-transitory computer-readable storage medium, storing computer-executable instructions which, when executed by a computer, causes the computer to carry out the signal state display method of claim 3.

16. A non-transitory computer-readable storage medium, storing computer-executable instructions which, when executed by a computer, causes the computer to carry out the signal state display method of claim 4.

17. A terminal device, comprising at least one processor and a memory communicably connected to the at least one processor, wherein the memory stores instructions executable by the at least one processor which, when executed by the at least one processor, causes the at least one processor to carry out the signal state display method of claim 7.

18. A non-transitory computer-readable storage medium, storing computer-executable instructions which, when executed by a computer, causes the computer to carry out the signal state display method of claim 7.

19. A non-transitory computer-readable storage medium, storing computer-executable instructions which, when executed by a computer, causes the computer to carry out the signal state display method of claim 8.

20. A non-transitory computer-readable storage medium, storing computer-executable instructions which, when executed by a computer, causes the computer to carry out the signal state display method of claim 9.

* * * * *